Figure 1:
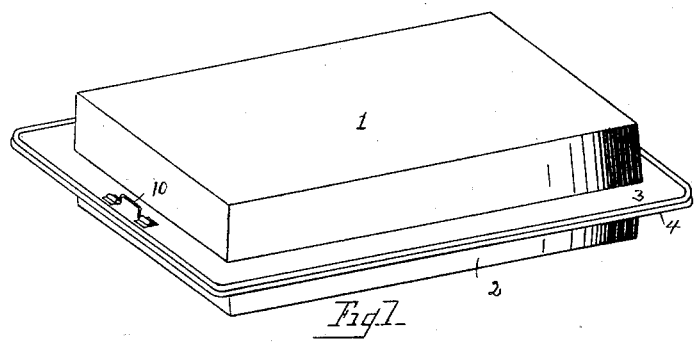

(No Model.)

H. L. LONG.
DEVICE FOR COOKING EGGS.

No. 462,929. Patented Nov. 10, 1891.

WITNESSES
Carroll J. Webster
Rolle Elliott

INVENTOR
Harriet L. Long
By Myers & Webster
Attys

UNITED STATES PATENT OFFICE.

HARRIET L. LONG, OF WEST TOLEDO, OHIO.

DEVICE FOR COOKING EGGS.

SPECIFICATION forming part of Letters Patent No. 462,929, dated November 10, 1891.

Application filed August 2, 1890. Serial No. 360,749. (No model.)

*To all whom it may concern:*

Be it known that I, HARRIET L. LONG, of West Toledo, in the county of Lucas and State of Ohio, have invented certain new and useful Improvements in a Device for Cooking Eggs; and I do hereby declare that the following is a full, clear, and exact description of the invention, which will enable others skilled in the art to which it appertains to make and use the same, reference being had to the accompanying drawings, and to the figures of reference marked thereon, which form part of this specification.

This invention relates to a device for steaming or boiling eggs.

Heretofore it has been customary to boil eggs in a receptacle containing boiling water. While this has accomplished the desired result, yet such a procedure is always attended with more or less danger of scalding the attendant, of overcooking the eggs, or of breaking the same in attempting their removal from the water when cooked. Another and very great objection to the old system is that it is practically impossible to cook a number of eggs to different degrees of hardness to suit the varied tastes of the consumers, inasmuch as all of the eggs are placed in one receptacle, and as there are no distinguishing-marks to designate those that have been cooking for, say, two minutes as against those that have been cooking three minutes, it frequently happens that when served they do not suit the persons to whom they are brought, thus entailing both trouble and loss upon the person furnishing the same.

It is the object of this invention to overcome these objections by producing a device which will rapidly cook eggs to the desired degree of hardness, which will admit of the eggs being removed when sufficiently cooked without any danger of scalding the attendant, and which will enable the attendant to distinguish between those eggs which are to be cooked to different degrees of hardness.

With these objects in view the invention consists in the novel construction and combination of parts of an egg-boiling device, as will be hereinafter fully described in the specification, illustrated in the drawings, and more particularly pointed out in the claim.

Figure 2:
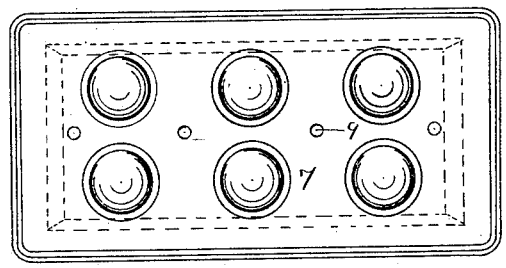
Figure 3:
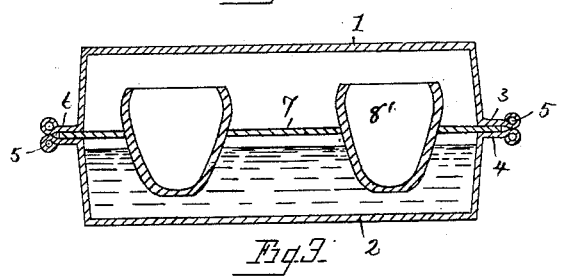

In the accompanying drawings, forming a part of this specification, and in which like numerals of reference indicate corresponding parts, Figure 1 is a perspective view of the device as it appears when closed and in use. Fig. 2 is a top plan view with the top removed. Fig. 3 is a transverse vertical sectional view, and Fig. 4 is a similar view showing a slight modification in the construction over that shown in Fig. 3.

Referring to the drawings, 1 and 2 designate two pans or chambers formed with flanges 3 and 4, extending from the four sides of each of the same, the edges of which flanges are wired, as shown at 5, so as to increase their strength, and also to form a space 6 between the same, in which rests a diaphragm 7. The chambers and diaphragm are made of any suitable material, preferably of sheet-iron, and may be ornamented in a manner to produce a neat and finished effect. The diaphragm 7 is provided with a series of openings 8, in which are placed cups or receptacles 8', in which the eggs to be cooked are placed, as shown in Fig. 3, and with smaller perforations 9, through which the steam from the lower chamber 2 is allowed to pass to the upper chamber.

Figure 4:
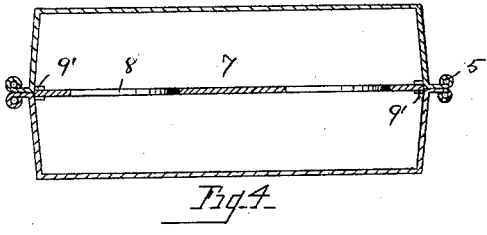

In Fig. 4 I have shown a slight modification in the manner of supporting the diaphragm within the chambers. In this instance the wired edges of the flanges lie flat in contradistinction to those shown in Fig. 3, which are apart, and the sides of each of the chambers are provided with flanges or shoulders 9', between which the diaphragm rests.

In operation the lower chamber is partially filled with water and placed upon the stove and brought to ebullition, the diaphragm carrying the cups and the top chamber being in place. The top chamber is then removed and the eggs are broken and placed within the cups and the top chamber is then replaced. As the steam rises from the water it passes to the top chamber, and thus thoroughly cooks the eggs by contacting directly therewith, while the lower portion is cooked by the heat from the water in which the bottom parts of the cups are immersed. When a sufficient time has elapsed the attendant removes the cover, handles 10 being provided to facilitate the same, and the cups containing the eggs may be readily removed without any danger of scalding the attendant. If desired, a certain number of the openings may be marked to designate and specify the length of time the eggs contained within the cups occupying the same are to be cooked, as, say, two minutes and one-half for some and for others, say, three minutes or longer, so that should two or three persons desire their eggs cooked different lengths of time it may be accomplished with readiness and ease by such an arrangement.

Having thus fully described my invention, what I claim as new, and desire to secure by Letters Patent, is—

An egg-boiling device comprising an upper pan or steam-chamber having a flange at its lower edge, a lower pan or hot-water chamber having a flange at its upper edge, an independent diaphragm having a series of large perforations and a series of small perforations, and cup-shaped receptacles arranged in the large perforations, the lower ends of which receptacles extend downward into the water-chamber and the upper ends project within the steam-chamber, whereby the eggs are cooked both by the hot water and the steam.

In testimony that I claim the foregoing as my own I hereby affix my signature in presence of two witnesses.

HARRIET L. LONG.

Witnesses:
WILLIAM WEBSTER,
R. M. ELLIOTT.